(12) United States Patent
Cauchy (10) Patent No.: US 7,082,773 B2
(45) Date of Patent: *Aug. 1, 2006

(54) TEMPERATURE-CONTROLLED STORAGE SYSTEM (75) Inventor: Charles J. Cauchy, Traverse City, MI (US)

(73) Assignee: Tellurex Corporation, Traverse City, MI (US)

( * ) Notice: Subject to any disclaimer, the term of this patent is extended or adjusted under 35 U.S.C. 154(b) by 247 days.

This patent is subject to a terminal disclaimer.

(21) Appl. No.: 10/415,018

(22) PCT Filed: Nov. 2, 2001

(86) PCT No.: PCT/US01/47555

§ 371 (c)(1), (2), (4) Date: Sep. 8, 2003

(87) PCT Pub. No.: WO02/37195

PCT Pub. Date: May 10, 2002

(65) Prior Publication Data

US 2004/0068992 A1 Apr. 15, 2004

Related U.S. Application Data (60) Provisional application No. 60/245,307, filed on Nov. 2, 2000.

(51) Int. Cl.
F25B 21/02 (2006.01)

(52) U.S. Cl. .............................. 62/3.3; 62/3.61; 62/3.6; 62/244

(58) Field of Classification Search .............. 62/3.1–3.7
See application file for complete search history.

(56) References Cited

U.S. PATENT DOCUMENTS

| 4,823,554 A | * | 4/1989 | Trachtenberg et al. | ......... 62/3.3 |
| 6,282,906 B1 | * | 9/2001 | Cauchy | ......... 62/3.3 |
| 6,412,287 B1 | * | 7/2002 | Hughes et al. | ......... 62/3.61 |
| 6,732,534 B1 | * | 5/2004 | Spry | ......... 62/3.7 |

* cited by examiner

Primary Examiner—Cheryl J. Tyler
Assistant Examiner—Filip Zec
(74) Attorney, Agent, or Firm—Flynn, Thiel, Boutell & Tanis, P.C.

(57) ABSTRACT

A temperature-controlled storage system has a compartment with a front wall containing a first heat exchanger, a heat pump for transferring heat to or removing heat from the first heat exchanger and a removable, portable container nested in the compartment such that a second heat exchanger provided in a front wall of the container is in thermal communication with the first heat exchanger. By controlling the operation of the heat pump, the insides of the container can be cooled or heated as desired.

9 Claims, 6 Drawing Sheets

TEMPERATURE-CONTROLLED STORAGE SYSTEM

This application claims the benefit of Provisional Application No. 60/245,307 filed Nov. 2, 2000.

CROSS-REFERENCE TO RELATED APPLICATIONS

This application is a 371 of PCT/US01/47555, filed Nov. 2, 2001, which claims the benefit of U.S. Ser. No. 60/245,307, filed Nov. 2, 2000.

FIELD OF THE INVENTION

The present invention generally relates to a mobile temperature-controlled storage system, and more particularly to a temperature controlled storage system which can be mounted in a mobile vehicle console and contain a removable portable container.

BACKGROUND OF THE INVENTION

Insulated boxes or containers, commonly referred to as "coolers", are well known for providing a manner of transporting and maintaining food, beverages, medicines and other perishable items while maintaining them within a desirable temperature range. Typically, these containers are provided with insulated walls to maintain the insides of the containers within a desired temperature range by reducing heat transfer through the container walls.

Another manner of controlling the interior temperature of a portable container involves the use of a heat pump, such as a thermoelectric system or a vapor compression system, in conjunction with a portable insulated container to actively heat or cool the contents thereof. Thermoelectric systems utilize the Peltier effect and solid state electronic components to operate as small heat pumps. These thermoelectric systems are formed by a plurality of thermocouples which are mounted between heat sinks and transfer thermal energy from one heat sink to the other depending on the direction of DC power applied thereto.

Consoles provided in vehicles have been used to provide an enclosed storage area which is accessible to the vehicle occupants. Typically, items not required to be maintained at a specified temperature are stored in the console and the console temperature generally corresponds to the ambient air temperature in the vehicle's cabin. However, it is not desirable to store perishable articles which have to be maintained within a specified temperature range, such as food, beverages, medicines, etc., in the console for an extended period of time.

All of these conventional storage systems have problems in that the portable containers either do not have a means for actively regulating the interior temperature thereof or are provided with self-contained heat pumps which raises the cost of the portable containers and makes them more unwieldy and the conventional vehicle consoles do not have a simple, efficient and inexpensive manner to regulate the temperature of a compartment contained therein and a removable, portable container which can form the interior of the compartment and self-regulate the temperature of its contents. The present invention addresses these needs.

SUMMARY OF THE INVENTION

The present invention provides a temperature-controlled storage system which can be provided independently or mounted in a vehicle console and controls the temperature of a removable, portable container nested therein by utilizing a heat pump. The system has a compartment in which the portable container is nested therein and heat exchange members mounted in the walls of the compartment and the container allow heat transfer between each other. The heat pump controls the flow of the thermal energy to or from the heat exchanger member mounted in the compartment wall and thereby enables the temperature inside the portable container to be raised or lowered.

A forced air convection device can be mounted in the console to draw and force air through a heat exchanger, temperature condition the air flowing through the convection device, and remove heat from or add heat to the heat pump.

DETAILED DESCRIPTION

The temperature-controlled storage system of the present invention can be mounted in a vehicle, such as an automobile, truck, van or boat, or function in a completely independent manner such as a stationary nesting arrangement where the temperature controlled storage system is used at a home or a hospital and a mobile nesting arrangement where the temperature controlled storage system is used at a hunting, camping or office site. Although the following description is for the inventive temperature-controlled storage system mounted in a van, the description is for exemplification purposes only and the present invention is by no means limited thereto.

Figure 1:
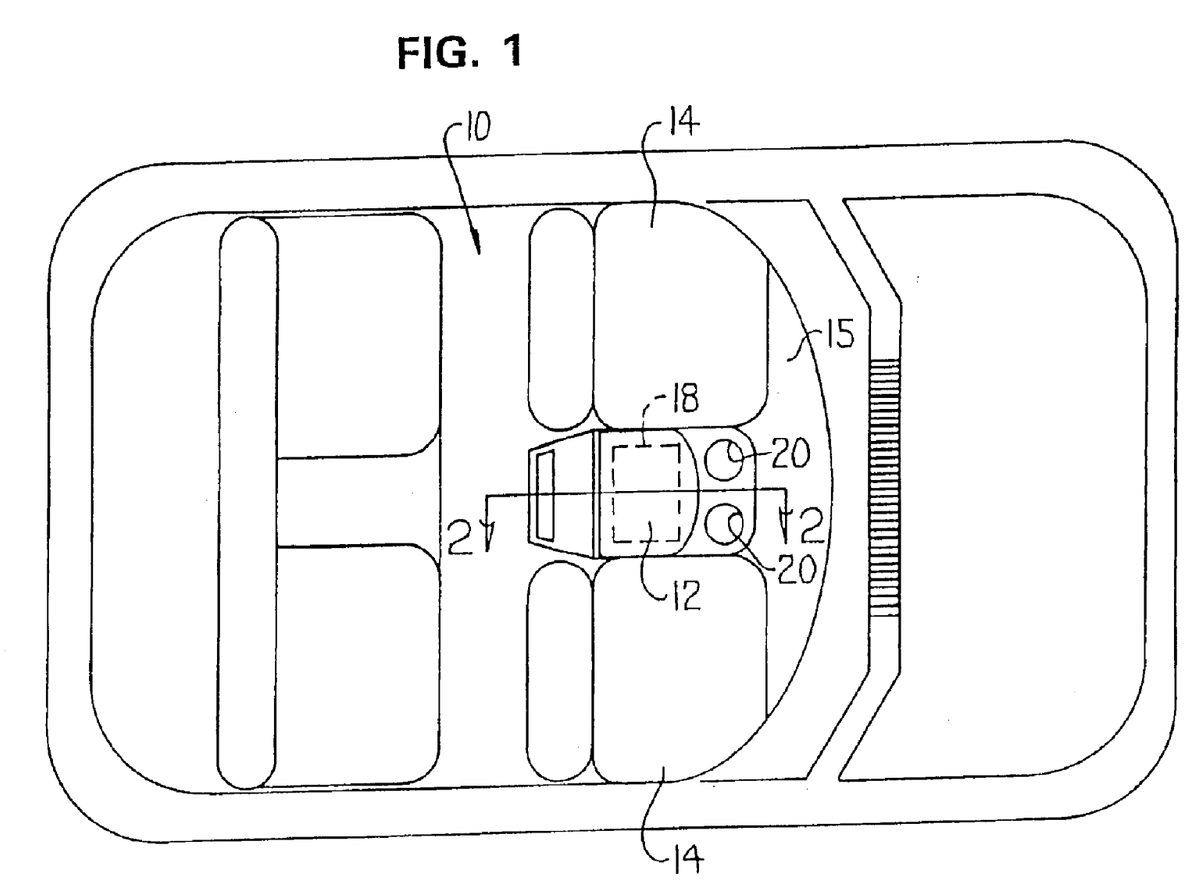
FIG. 1 is a top view of a vehicle passenger compartment containing a console.
Figure 2:
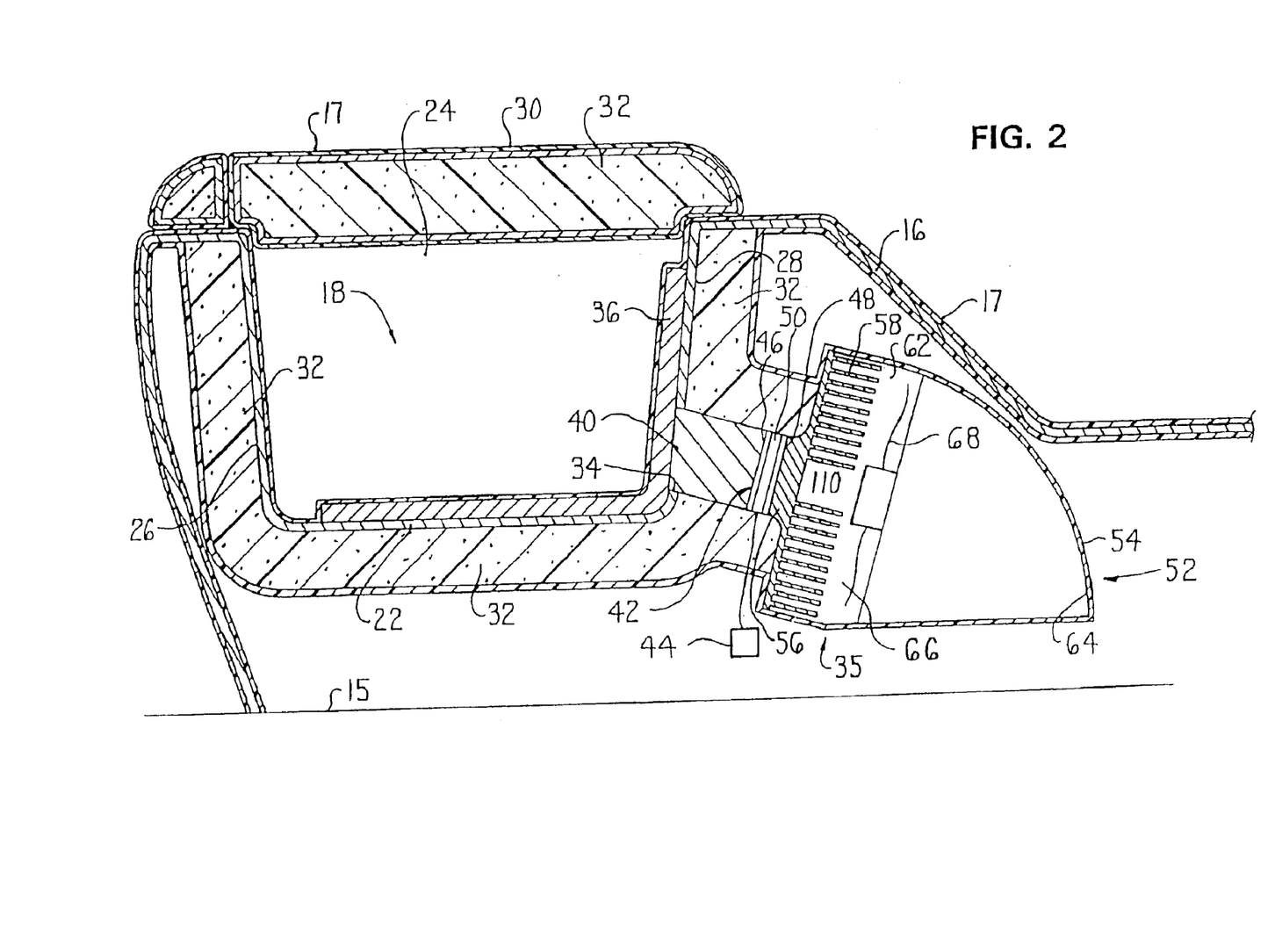
FIG. 2 is a cross sectional view of the console of FIG. 1 containing the mobile temperature-controlled storage system of the present invention.

FIGS. 1 and 2 illustrate a motor vehicle passenger compartment 10 having a console 12 positioned between seats 14. The console 12 is typically formed of plastic and is a rigid body or housing 16 which is secured to the vehicle compartment floor 15 and covered by a protective covering 17. The console 12 has an enclosed compartment 18 and cup holders 20 which are positioned forwardly of the storage compartment 18 and recessed into the console body 16. The compartment 18 is bounded by front wall 28, rear wall 26, bottom wall 22, side walls 24 and a cover 30 as illustrated in FIG. 2. The walls 22, 24, 26 and 28 and cover 30 can be formed of a thermally insulating material or merely laminated with insulation 32 to thermally isolate the compartment 18 from the ambient environment. The front wall 28 has an opening extending therethrough with a thermally conductive element 40 provided therein and forming a part of the front wall 28.

The thermally conductive element 40 can be structured from solid aluminum or any other thermally conductive material so long as it has adequate thermal conductive properties and is in contact with a heat pump such as a thermoelectric system 42 at an end remote from the compartment 18. The thermoelectric system 42 is connected to an electrical power supply 44 mounted in the vehicle, such as a 12 volt electrical system of an automobile. Insulation 32 is provided around the thermoelectric system to thermally isolate it from the ambient environment. Heat sink plates 46, 48 are attached to thermoelectric device 50 and act as a hot sink and a cold sink depending on the direction of direct current flowing from the electrical power source 44 to the thermoelectric device 50. A heat sink plate 46 is in thermal communication with an end of the thermally conductive element 40 to transfer heat to or remove heat from the thermally conductive element 40.

A removable, portable container 120 is provided which is adapted to be nestingly received inside the compartment 18. The container 120 comprises a front wall 122, a rear wall 123, a bottom wall 124, side walls 125 and a lid 126 enclosing a compartment 127 for containing items to be temperature controlled. The walls and lid of the container are preferably formed of a thermally insulating material, such as polystyrene or polyurethane, to thermally isolate the compartment 127 from the ambient environment. An opening 128 is provided in the front wall 122 of the container 120 and a second thermally conductive element 129 is provided therein such that when the container 122 is nested in the console compartment 18, the second thermally conductive element 129 is brought into direct contact or thermal communication with the first thermally conductive element 40. A thermally conductive member such as an L-shaped heat exchanger 36 is provided in the compartment 127 and is in thermal communication or direct contact with the second thermally conductive element 129 so that heat can be transferred between the compartment 127 and the second thermally conductive element 129. The L-shaped heat exchanger 36 forms at least part of the inside front and bottom walls of the container 120. Heat transfer connection means 130, such as protuberances, can be provided on the L-shaped heat exchanger 36 in order to thermally and physically connect an optional, removable phase change module 131 thereto through receptors provided therein.

In alternative embodiments of the present invention, the L-shaped heat exchanger 36 can be replaced by a heat exchanger that covers at least a part of the inner wall surface of not only the front wall 122 of the container 120 and, optionally, at least a part of the inner wall surfaces of at least one of the rear wall 123, bottom wall 124 and sidewalls 125 of the container. The L-shaped heat exchanger 36 can also be replaced by a thermally conductive material, such as pyrolytic carbon, which is provided on and/or dispersed in the inner wall surface of the container 120.

The heat transfer connection means 130 likewise is not limited to a protuberance provided on the L-shaped heat exchanger and can be of any form and provided on or in any of the inner wall surfaces of the container 120 as long as they provide satisfactory heat transfer between the phase change module 131. The phase change module 131 also can be varied in form and not limited to the configuration illustrated in FIG. 2. For instance, it can be provided in the form of a partition which is received in slots provided in the thermally conductive inner surfaces of the container 120.

The phase change module 131 contains a material which will undergo a phase change upon heating or cooling and can be used to help maintain the temperature of the container compartment 127 when it is not nested within the console compartment 18, the electrical power supply 44 to the thermoelectric system 42 is shut off or the container 120 is nested in the compartment 18 but thermally conductive elements 40, 129 are not in thermal communication with each other. Covers (not shown) can be provided over both the first and second thermally conductive elements 40, 129 to protect and thermally insulate them from the ambient environment and each other when desired.

An air duct assembly 52 is mounted within the console 12 and is in thermal communication with the thermoelectric system 42. The air duct assembly 52 has a housing 54 and a solid extension member 56 extending from the housing and contacting with heat sink plate 48. The solid extension member 56 is made of a thermally conductive material such as aluminum. Within the housing 54, radiator fins 58 are provided which extend from the solid extension member 56. Thus, the heat sink plate, solid extension member 56 and radiator fins 58, in combination, form a heat sink. The air duct assembly 52 comprises an inflow air duct 64, an open area 110 within the housing, and an outflow air duct 66 which are in fluid communication with each other to provide air flow through the assembly. The outflow air duct 66 passes air by the radiator fins 58 and a side of a solid extension member 56 so that heat is transferred to the incoming air and is vented with the outgoing air when the container 120 is being cooled. The outflow air duct 66 provides an outward air flow path transverse from the flow path of the inflow air duct 64. When the container 120 is being heated, heat is removed from the incoming air and transferred to the container by the thermoelectric system 42. To positively provide air flow through the air duct assembly 52, a fan 68 is provided to draw the incoming air through the inflow air duct 64, past the extension member 56, through the radiator fins 58 and exhaust the air into outflow air duct 110.

Figure 3:
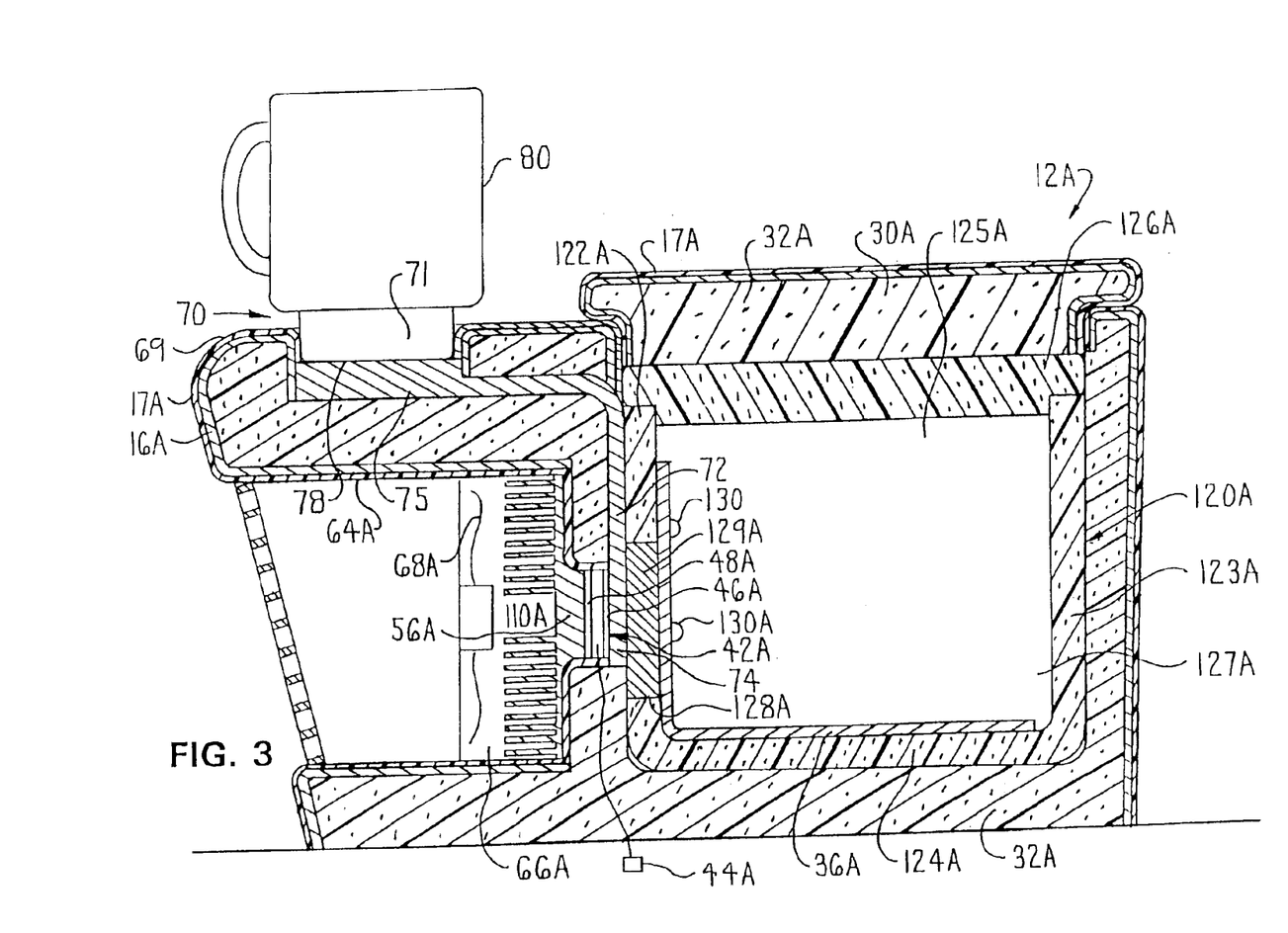
FIG. 3 is a cross sectional view of a further embodiment of the present invention.

FIG. 3 illustrates a second embodiment of the present invention. In FIG. 3, like elements having the identical function as elements in FIG. 2 will be given the same numerical designation followed by the suffix "A". A modified console 12A has a forwardly extending, insulated beverage container support member 69 provided at an upper forward position thereof. A beverage container recess 71 is provided in an upper portion of support member 69 and is adapted to receive a bottom portion of a beverage container 80 therein. The modified console 12A includes an integral beverage container cooler/heater assembly 70 which is made up of a modified heat exchanger 72 that has a horizontally disposed upper leg 75 joined to a vertically disposed lower leg 74. The lower leg 74 is in thermal communication or direct contact with a heat sink plate 46A of the thermoelectric system 42A so that the thermoelectric system 42A can pump heat to or from the heat exchanger 72. An upper portion 78 of the upper leg 75 has a depression formed in an upper surface thereof for the beverage container 80 to be seated therein to aid in the heat transfer between the beverage container and the heat exchanger 72. Temperature control circuitry and over-heat protection circuitry can also be incorporated into the present invention to help regulate the inner temperature of the container 120.

Although the present invention has been described by using a thermoelectric device as the heat pump, the present invention is not limited thereby and other heat pump systems, such as vapor compression system, could also be utilized in the present invention.

While it is believed that operation of the present invention is apparent based on the above description, a typical operation is outlined below for convenience. If it is desired to cool the compartment 127 inside of the container 120 when it is nested in the console compartment 18, DC power from the power source 44 is sent to the thermoelectric system 42. The direction of current flow causes the thermoelectric system to transfer thermal energy from one heat sink plate 46 to the other heat sink plate 48. The heat sink plate 46 transfers thermal energy from the first thermally conductive element 40 which in turn transfers thermal energy from the second thermally conductive element 129 which is in contact therewith, and in turn draws thermal energy from the heat exchanger 36. The heat exchanger 36 transfers thermal energy from the container compartment 127. Thermal energy builds up at the heat sink plate 48 and is transferred to the extension member 56 and radiator fins 58 of air duct housing 54. The extension member 56 and radiator fins 58 transfer the thermal energy to air passing through the air duct assembly. The fan 68 pulls air in through the inflow air duct 54 and pushes air out of the outflow air duct 66A past the radiating fins 58 and extension member 56. Thereby, heat is transferred from the compartment 127 of the container 120 and is vented out in the air from air duct 66. If it is desired to heat the container compartment 127, then the DC power supplied to the thermoelectric system is reversed to force heat to flow toward the compartment 18.

The FIG. 3 embodiment includes the compartment 127A in the same manner as explained above with respect to FIG. 2 and can additionally, simultaneously cool the beverage container 80 outside of the compartment 127A. The heat exchanger 72 draws thermal energy from the compartment 127A and from the heat exchanger upper portion 78. The heat exchanger upper portion 78 draws thermal energy from the beverage container 80 seated in the recess 71 and cools the beverage contained therein.

Figures 4, 5:
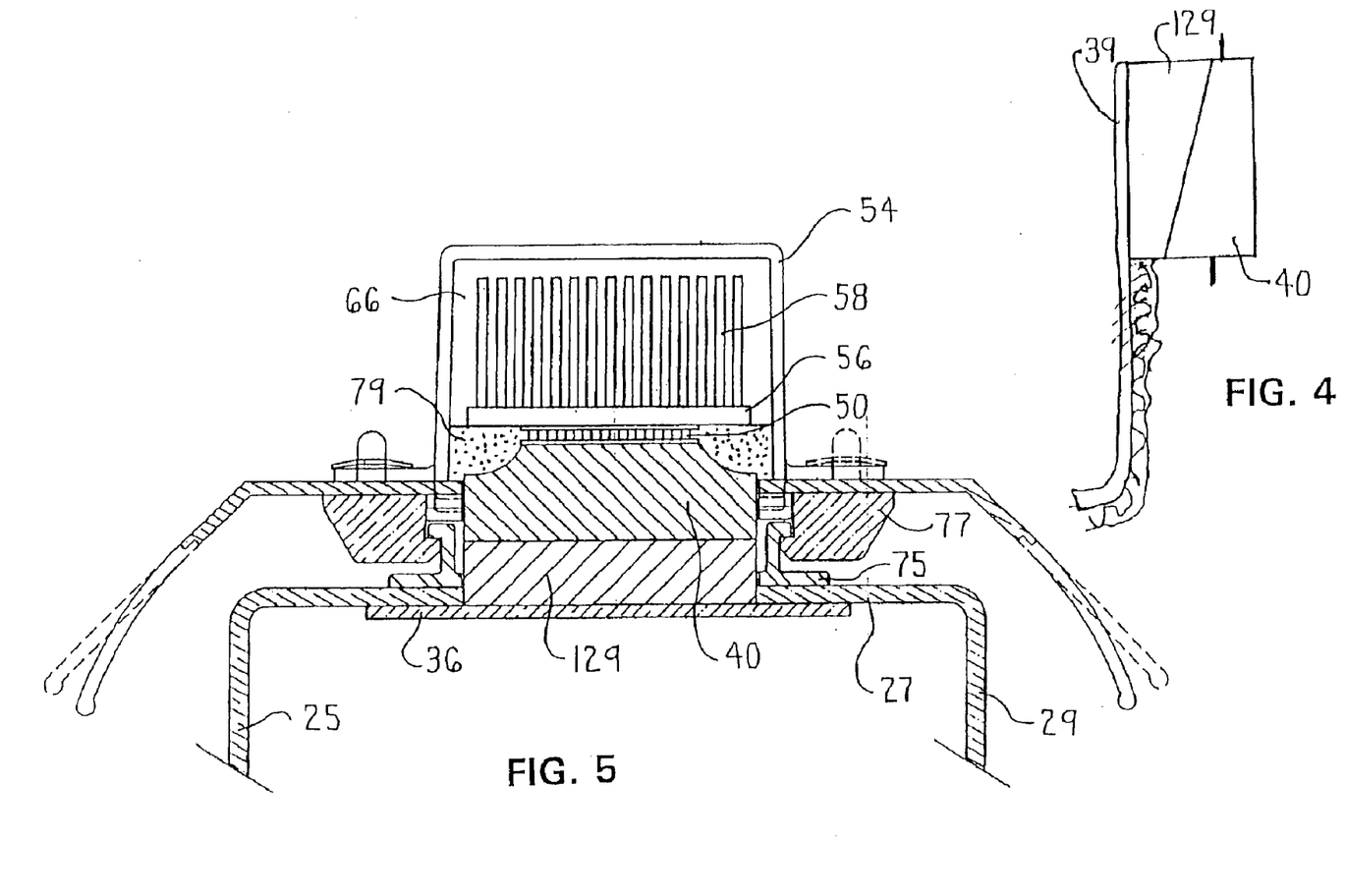
FIG. 4 is a partial cross-sectional view showing another embodiment of an L-shaped heat exchanger, thermally conductive element 40, and second thermally conductive element 129.
FIG. 5 is a partial cross-sectional view of another embodiment showing an interface between the thermally conductive element 40 of the insulated bag and the connecting elements of the console.

The flexible container shown in FIG. 4 is a partial cross sectional view showing another embodiment of an L-shaped heat exchanger 36, first thermally conductive element 40, and second thermally conductive element 129. In this embodiment the L-shaped heat exchanger 36 is secured to the second conductive element 129 in a standard manner. As in the other embodiments, to heat or cool the interior of the container, a surface of the second conductive element 129 is placed into surface-to-surface contact with the first conductive element 40. As shown in FIG. 4, the surfaces of the conductive elements 40, 129 are angled with respect to the vertical. This arrangement improves the contact between the two surfaces.

Other embodiments of the invention include different types of elements and materials, as well as different arrangements.

For example, in some embodiments, the removable portable container 120 can be a flexible bag or container made of a flexible material. For example, aluminized Mylar is a flexible insulating material. Thus, the portable flexible container is light-weight and can be collapsed for storage. Such a container can still be utilized with a console 12 in a vehicle. The container can include a pliable handle connected to a top of the container. A zipper type closure can extend about the edges of three sides of the flat rectangular top surface of the container. Such a bag type container must include an opening from which a conductive element 129 can protrude for contact with a conductive element 40 in the console body 16.

For the embodiment having a flexible container 120, the L-shaped heat exchanger 36 can be made of aluminum and include an aluminum hinge pin. The hinge pin is located where the two segments of the L-shaped heat exchanger 36 join. Thus, the segments of the L-shaped heat exchanger 36 can pivot at the hinge pin. This enables folding of the flexible bag for storage. Thus, the flexible container can be reduced in size at the convenience of a user.

In another embodiment for a flexible container, the L-shaped heat exchanger 36 can be made of a flexible conductive material, such as pyrolytic graphite. The material bends to enable folding or size reduction of the flexible container 120.

The partial cross sectional view of the flexible container 120 shown in FIG. 5 illustrates the interface between the flexible container 120 and the housing 16 of the console 12.

The flexible container 120 includes integral flexible walls 25, 27, 29. The heat exchanger 36 is secured to a second thermally conductive element 129. The thermally conductive element 129 projects outwardly through an opening in the container wall 27. A bayonet type slide fitting 75 is secured to the container wall 27 about the opening receiving the element 129. The bayonet slide fitting 75 mates with a bayonet slide receiving fitting 77 attached to the console.

The console includes an arrangement similar to that disclosed in FIG. 1. One side of the thermoelectric device 50 is conductively secured to a heat sink located within an air duct assembly. The opposing side of the thermoelectric device 50 is conductively secured in face-to-face relationship with the conductive element 40. An insulating material 79 extends about the periphery of the conductive element 40.

When the bayonet fittings are secured, the flat surface of the conductive element 40 contacts an opposing flat surface of the conductive element 129. This arrangement enables the flexible container 120 to be heated/cooled as described in the embodiments of FIGS. 2 and 3.

Figure 6:
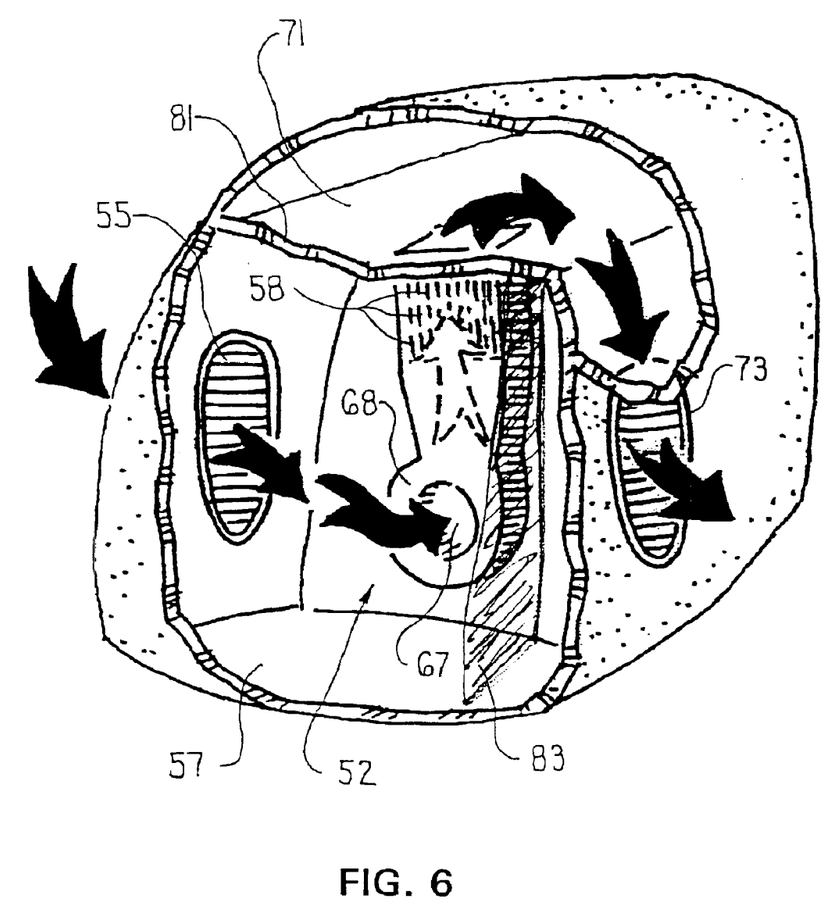
FIG. 6 is a partial cross-sectional view of another embodiment showing the cooling arrangement inside of the console.

FIG. 6 shows the flow path of cooling air through the console. Air enters through an inlet vent 55 into an inlet chamber 57 in the housing 16. Then opening 67 of fan 68 receives the air. The fan 68 drives the air across the cooling or radiator fins 58, shown as dashes within the flow path in the housing above the fan.

In this embodiment, the radiator fins 58 preferably are needle shaped fins in rows and columns enabling air to pass therebetween. Thus, unlike the embodiment in FIG. 1, the air flow approaches the fins from the side.

As shown by the arrows in FIG. 6, as the airflow leaves the area of the heat sink, the air enters an exit chamber 71. An outlet vent 73 provides an exit flow path for the air in the exit chamber 71. Wall members 81, 83 define the inlet chamber 57 and the exit chamber 71.

In conclusion, air enters the console through inlet vent 55 and exits through outlet vent 73.

Figure 7:
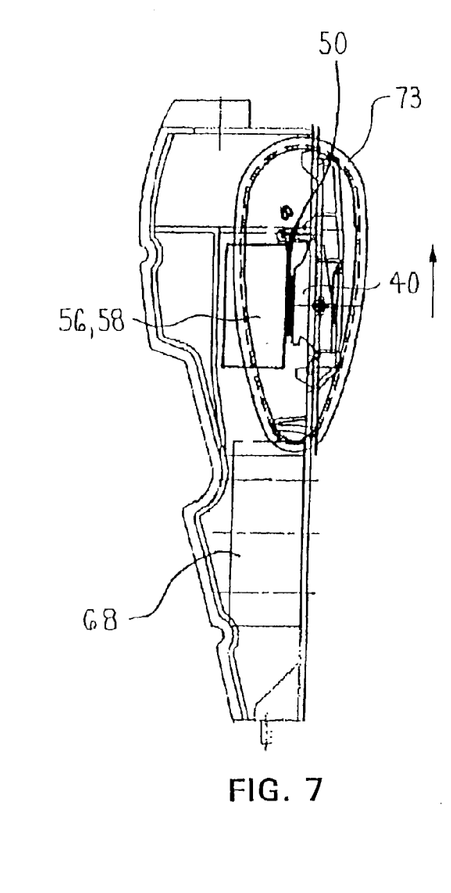
FIG. 7 is a partial cross-sectional side view of the FIG. 6 embodiment showing the interface between the console and the cooling arrangement including the air duct assembly 52 with the flexible container.

FIG. 7 is a partial cross-sectional side view of the FIG. 6 embodiment. The view includes an end wall 81 of the console. FIG. 7 shows the air outlet vent 73. The air outlet vent 73 is superimposed on the cross sectional view to illustrate the flow path of air through the air duct assembly 52. The air enters through the inlet vent 55 shown in FIG. 6. Fan 68 then forces the air upwardly across the heat sink including the radiator fins 58. The heat sink in FIG. 6 is drawn in block diagram form, but includes a plurality of the fins 58 extending away from the thermoelectric device 50 and the conductive element 40. The air then enters the exit chamber 71 and exits through the air outlet vent 73.

Figure 8:
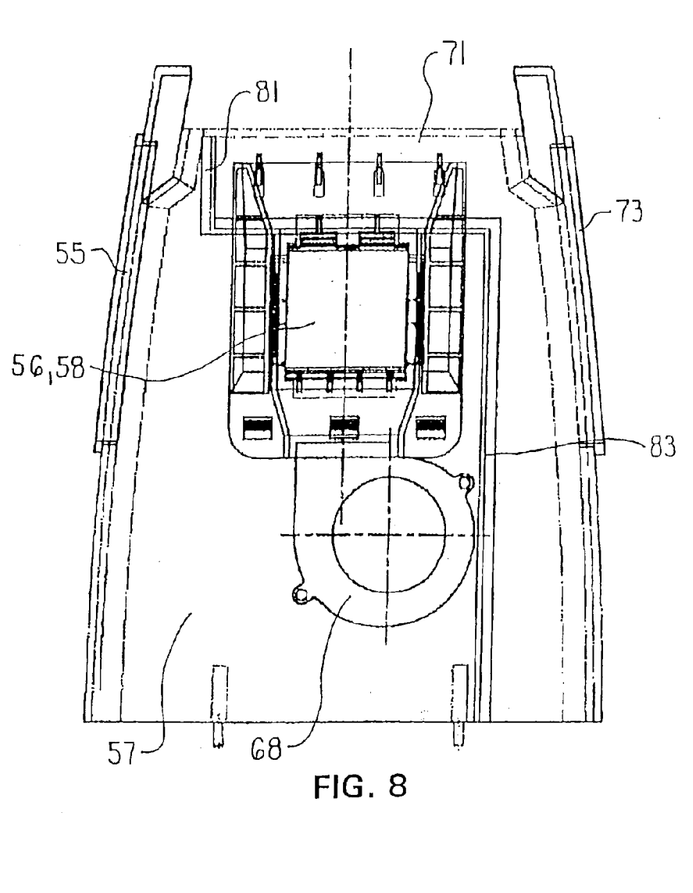
FIG. 8 is a partial cross-sectional side view taken in the direction of arrow X in FIG. 7.

The cross sectional view of FIG. 8, taken in the direction X in FIG. 7, better illustrates the arrangement of FIG. 6. The air inlet vent 55 enables the flow of air into the inlet chamber 57. The fan 68 receives the air and drives the air upwardly across the heat sink 56, 58 drawn in block diagram form. Then, as in FIG. 7, the air draws heat from the heat sink, passes through exit chamber 71 and exits the console through air outlet vent 73.

While FIGS. 6–8 show various 90 degree turns for the air flow, other arrangements are contemplated. For example, a direct air flow path across the console is contemplated. Such an arrangement is a direct path through the inlet vent 55, across the heat sink elements 56, 58 and through the outlet vent 73.

Although particular preferred embodiments of the present invention have been disclosed in detail for illustrative purposes, it will be recognized that variations or modifications of the disclosed apparatus, including the rearrangement of parts, lie within the scope of the present invention.

What is claimed is:

1. A temperature-controlled storage system comprising: a housing enclosing a compartment for receiving a removable, portable container therein, said compartment comprising a front wall, a back wall, two side walls, a bottom wall and a first heat exchange member forming at least a part of the front wall; heat pump means for transferring heat to or removing heat from said first heat exchange member; and the removable, portable container, said container comprising a front wall, a back wall, two side walls, a bottom wall, a top wall and a second heat exchange member provided in the container front wall for thermally communicating with the first heat exchange member.

2. The temperature-controlled storage system of claim 1, wherein said heat pump means is a thermoelectric device.

3. The temperature-controlled storage system of claim 1, wherein said heat pump means is a vapor compression system.

4. The temperature-controlled storage system of claim 1, wherein said container additionally comprises a thermally conductive member in thermal communication with said second heat exchange member.

5. The temperature-controlled storage system of claim 1, wherein the walls of the container are made of a thermally insulating material.

6. The temperature-controlled storage system of claim 1, wherein the container top wall is removable from the container.

7. The temperature-controlled storage system of claim 1, wherein the container top wall is pivotably mounted on the container.

8. The temperature-controlled storage system of claim 4, additionally comprising heat transfer means provided on said thermally conductive member and a phase-change module in thermal communication with and removably connected to the heat transfer means.

9. The temperature-controlled storage system of claim 8, wherein the phase change module contains a material which will undergo a phase change upon heating or cooling.

* * * * *